United States Patent
B'Far et al.

(10) Patent No.: US 10,372,781 B2
(45) Date of Patent: *Aug. 6, 2019

(54) HEURISTIC CACHING TO PERSONALIZE APPLICATIONS

(71) Applicant: Oracle International Corporation, Redwood Shores, CA (US)

(72) Inventors: Reza B'Far, Huntington Beach, CA (US); Alan Waxman, Morganville, NJ (US); Kent Spaulding, Portland, OR (US)

(73) Assignee: Oracle International Corporation, Redwood Shores, CA (US)

(*) Notice: Subject to any disclaimer, the term of this patent is extended or adjusted under 35 U.S.C. 154(b) by 168 days.

This patent is subject to a terminal disclaimer.

(21) Appl. No.: 14/957,904

(22) Filed: Dec. 3, 2015

(65) Prior Publication Data

US 2016/0094676 A1    Mar. 31, 2016

Related U.S. Application Data

(63) Continuation of application No. 13/558,292, filed on Jul. 25, 2012, now Pat. No. 9,348,936.

(51) Int. Cl.
*H04L 29/08* (2006.01)
*G06F 16/957* (2019.01)
(Continued)

(52) U.S. Cl.
CPC ........ *G06F 16/9574* (2019.01); *G06F 3/0481* (2013.01); *G06F 3/04847* (2013.01); *H04L 67/2842* (2013.01)

(58) Field of Classification Search
CPC ............ G06F 17/30902; G06F 3/0481; G06F 3/04847; H04L 67/2842
See application file for complete search history.

(56) References Cited

U.S. PATENT DOCUMENTS

| 5,727,129 A | 3/1998 | Barrett |
| 5,978,841 A | 11/1999 | Berger |

(Continued)

FOREIGN PATENT DOCUMENTS

| CN | 104584008 A | 4/2015 |
| EP | 2877944 | 6/2015 |
| WO | 2014018346 A1 | 1/2014 |

OTHER PUBLICATIONS

Mukhopadhyay (see "A Dynamic Web Page Prediction Model Based on Access Patterns to Offer Better User Latency" retrieved http://arxiv.org/ftp/arxiv/papers/1102/1102.0684.pdf, dated Feb. 3, 2011, last accessed Jan. 16, 2014).*

(Continued)

*Primary Examiner* — Jung-Mu T Chuang
(74) *Attorney, Agent, or Firm* — Kilpatrick Townsend & Stockton LLP

(57) ABSTRACT

Heuristic caching techniques are used to improve application usability within the constraints of computing resources. A user's behavior in connection with an application is recorded and used to intelligently determine which transitions of a user interface of the application to cache. In addition, the user may have one or more characteristics. Such characteristics may also be used to identify other users so that the other users' behavior in connection with the application can be used for intelligently determining which transitions of the user interface to cache.

18 Claims, 10 Drawing Sheets

(51) Int. Cl.
*G06F 3/0481* (2013.01)
*G06F 3/0484* (2013.01)

(56) References Cited

U.S. PATENT DOCUMENTS

| | | | | |
|---|---|---|---|---|
| 6,067,565 A * | 5/2000 | Horvitz | G06F 17/30861 | 707/E17.107 |
| 6,085,226 A * | 7/2000 | Horvitz | G06F 17/30902 | 707/E17.12 |
| 6,182,133 B1 * | 1/2001 | Horvitz | G06F 17/30902 | 707/999.008 |
| 6,438,579 B1 * | 8/2002 | Hosken | G06F 17/30867 | 707/999.002 |
| 6,549,896 B1 * | 4/2003 | Candan | G06F 17/30902 | |
| 6,742,033 B1 | 5/2004 | Smith | | |
| 6,766,422 B2 * | 7/2004 | Beyda | G06F 17/30902 | 707/E17.12 |
| 6,782,423 B1 * | 8/2004 | Nakayama | G06F 16/951 | 709/224 |
| 6,839,680 B1 * | 1/2005 | Liu | G06Q 30/0204 | 705/7.33 |
| 6,850,252 B1 * | 2/2005 | Hoffberg | G06K 9/00369 | 348/E7.061 |
| 6,871,213 B1 * | 3/2005 | Graham | G06F 17/30873 | 707/E17.111 |
| 6,871,218 B2 * | 3/2005 | Desai | G06F 17/30902 | 707/E17.12 |
| 6,907,459 B2 * | 6/2005 | Chi | G06F 17/30864 | 707/999.003 |
| 7,050,079 B1 * | 5/2006 | Estrada | G06F 17/30873 | 345/557 |
| 7,051,161 B2 * | 5/2006 | Dixit | G06F 12/0888 | 707/E17.12 |
| 7,092,936 B1 * | 8/2006 | Alonso | G06F 17/30672 | 707/737 |
| 7,096,418 B1 * | 8/2006 | Singhal | G06F 17/30902 | 707/E17.12 |
| 7,181,438 B1 * | 2/2007 | Szabo | G06F 21/6245 | |
| 7,203,909 B1 * | 4/2007 | Horvitz | G06F 17/30867 | 707/E17.109 |
| 7,257,577 B2 * | 8/2007 | Fagin | G06F 17/30864 | |
| 7,331,038 B1 * | 2/2008 | Snodgrass | G06F 17/30893 | 717/123 |
| 7,509,299 B2 * | 3/2009 | Liu | G06F 17/30864 | 706/62 |
| 7,546,295 B2 | 6/2009 | Brave et al. | | |
| 7,548,982 B2 | 6/2009 | Gu et al. | | |
| 7,580,930 B2 * | 8/2009 | Brave | G06F 17/30867 | |
| 7,634,476 B2 * | 12/2009 | Liu | G06F 17/30864 | |
| 7,693,836 B2 | 4/2010 | Brave et al. | | |
| 7,716,225 B1 * | 5/2010 | Dean | G06F 17/30867 | 707/748 |
| 7,787,489 B2 | 8/2010 | Caulfield et al. | | |
| 7,801,896 B2 * | 9/2010 | Szabo | G06F 17/30522 | 707/715 |
| 7,831,472 B2 | 11/2010 | Yufik | | |
| 7,840,911 B2 | 11/2010 | Milener et al. | | |
| 7,849,202 B2 * | 12/2010 | Muret | H04L 67/22 | 709/203 |
| 7,890,998 B2 | 2/2011 | Lu et al. | | |
| 7,930,303 B2 * | 4/2011 | Liu | G06F 17/30864 | 707/748 |
| 7,941,383 B2 * | 5/2011 | Heck | G06F 17/30873 | 706/21 |
| 8,069,167 B2 * | 11/2011 | Gao | G06F 17/30864 | 707/706 |
| 8,117,209 B1 * | 2/2012 | Dean | G06F 17/30867 | 707/727 |
| 8,145,784 B2 | 3/2012 | See et al. | | |
| 8,200,691 B2 * | 6/2012 | Xu | G06Q 10/10 | 379/265.09 |
| 8,230,046 B2 | 7/2012 | Jiang | | |
| 8,244,722 B1 * | 8/2012 | Koningstein | G06F 16/338 | 707/723 |
| 8,312,171 B2 * | 11/2012 | B'Far | G06F 21/10 | 707/999.102 |
| 8,332,917 B2 | 12/2012 | Forster et al. | | |
| 8,392,837 B2 | 3/2013 | Li | | |
| 8,490,093 B2 | 7/2013 | Russinovich et al. | | |
| 8,510,237 B2 | 8/2013 | Cascaval et al. | | |
| 8,549,497 B2 | 10/2013 | Ghorbani et al. | | |
| 8,577,900 B2 | 11/2013 | Bao et al. | | |
| 8,600,921 B2 * | 12/2013 | Burkard | G06F 17/30864 | 706/45 |
| 8,627,479 B2 | 1/2014 | Wittenstein et al. | | |
| 8,655,819 B1 * | 2/2014 | Burkard | G06N 5/048 | 706/45 |
| 8,732,569 B2 * | 5/2014 | Burkard | G06F 17/30902 | 715/206 |
| 8,745,212 B2 | 6/2014 | Jain | | |
| 8,756,684 B2 | 6/2014 | Frantz et al. | | |
| 8,798,205 B2 | 8/2014 | Ecker et al. | | |
| 8,869,250 B2 | 10/2014 | Forster et al. | | |
| 8,904,409 B2 | 12/2014 | Jaffer et al. | | |
| 8,954,422 B2 * | 2/2015 | Hasan | G06F 17/30386 | 707/723 |
| 8,954,524 B1 | 2/2015 | Hamon | | |
| 9,225,738 B1 * | 12/2015 | Chiles | H04L 63/1425 | |
| 9,305,099 B1 * | 4/2016 | Dean | G06F 17/30867 | |
| 9,323,811 B2 * | 4/2016 | Hasan | G06F 17/30386 | |
| 9,348,936 B2 | 5/2016 | B'far et al. | | |
| 2001/0051525 A1 | 12/2001 | Rayne | | |
| 2003/0021283 A1 | 1/2003 | See et al. | | |
| 2003/0058277 A1 | 3/2003 | Bowman-Amuah | | |
| 2003/0061451 A1 * | 3/2003 | Beyda | G06F 17/30902 | 711/137 |
| 2004/0054682 A1 | 3/2004 | Kano | | |
| 2004/0088276 A1 * | 5/2004 | Elder | G06F 17/30867 | |
| 2004/0098486 A1 * | 5/2004 | Gu | G06F 17/30902 | 709/228 |
| 2004/0117222 A1 * | 6/2004 | Rokosz | G06F 17/30705 | 705/7.11 |
| 2005/0033803 A1 * | 2/2005 | Vleet | G06F 17/30867 | 709/203 |
| 2005/0055426 A1 * | 3/2005 | Smith | G06F 17/30902 | 709/219 |
| 2005/0076253 A1 | 4/2005 | Lu | | |
| 2005/0216519 A1 | 9/2005 | Mayo et al. | | |
| 2005/0262050 A1 * | 11/2005 | Fagin | G06F 17/30864 | |
| 2006/0070012 A1 * | 3/2006 | Milener | G06F 3/0482 | 715/822 |
| 2006/0259344 A1 * | 11/2006 | Patel | G06Q 10/0635 | 705/7.33 |
| 2006/0259867 A1 | 11/2006 | Watson et al. | | |
| 2006/0277277 A1 * | 12/2006 | Landschaft | G06F 17/30902 | 709/220 |
| 2007/0106748 A1 * | 5/2007 | Jakobsson | H04L 63/0807 | 709/217 |
| 2007/0112768 A1 * | 5/2007 | Majumder | G06F 17/30864 | |
| 2007/0136533 A1 * | 6/2007 | Church | G06Q 30/0277 | 711/137 |
| 2007/0150464 A1 * | 6/2007 | Brave | G06F 17/30867 | |
| 2007/0150515 A1 | 6/2007 | Brave et al. | | |
| 2007/0156677 A1 | 7/2007 | Szabo | | |
| 2007/0214108 A1 * | 9/2007 | Liu | G06F 17/30864 | |
| 2008/0027936 A1 * | 1/2008 | Liu | G06F 17/30864 | |
| 2008/0052152 A1 * | 2/2008 | Yufik | G06Q 30/02 | 705/14.34 |
| 2008/0195824 A1 | 8/2008 | Sadovsky et al. | | |
| 2008/0209050 A1 * | 8/2008 | Li | H04L 29/06 | 709/227 |
| 2008/0209338 A1 * | 8/2008 | Li | G06F 17/30867 | 715/745 |
| 2008/0313247 A1 * | 12/2008 | Galvin | G06F 17/30864 | 708/200 |
| 2009/0007249 A1 | 1/2009 | Lu et al. | | |
| 2009/0070012 A1 * | 3/2009 | Achleitner | F02D 41/008 | 701/103 |

(56) References Cited

U.S. PATENT DOCUMENTS

| | | | |
|---|---|---|---|
| 2009/0164395 A1* | 6/2009 | Heck | G06F 17/30873 706/16 |
| 2009/0276764 A1 | 11/2009 | Ghorbani et al. | |
| 2009/0282421 A1 | 11/2009 | Jaffer et al. | |
| 2009/0307161 A1* | 12/2009 | Dalal | G06N 99/005 706/12 |
| 2009/0313562 A1* | 12/2009 | Appleyard | H04L 41/22 715/764 |
| 2010/0109132 A1 | 5/2010 | Ko et al. | |
| 2010/0250555 A1* | 9/2010 | Gao | G06F 17/30864 707/749 |
| 2011/0022945 A1* | 1/2011 | Yang | G06F 16/957 715/234 |
| 2011/0029378 A1 | 2/2011 | Ramer et al. | |
| 2011/0066676 A1* | 3/2011 | Kleyzit | G06F 17/30902 709/203 |
| 2011/0066709 A1 | 3/2011 | Khurana et al. | |
| 2011/0066982 A1* | 3/2011 | Paulsami | G06F 3/0482 715/835 |
| 2011/0078598 A1* | 3/2011 | Barak | G06F 16/9577 715/765 |
| 2011/0145287 A1* | 6/2011 | Jiang | G06F 17/30905 707/780 |
| 2011/0153555 A1 | 6/2011 | Falkenberg et al. | |
| 2011/0185421 A1 | 7/2011 | Wittenstein et al. | |
| 2011/0196752 A1 | 8/2011 | Paulik et al. | |
| 2012/0005192 A1* | 1/2012 | Bao | G06F 16/9558 707/721 |
| 2012/0036123 A1* | 2/2012 | Hasan | G06Q 30/02 707/723 |
| 2012/0084343 A1 | 4/2012 | Mir et al. | |
| 2012/0233096 A1* | 9/2012 | Gupta | G06F 17/30864 706/12 |
| 2012/0239598 A1 | 9/2012 | Cascaval et al. | |
| 2012/0246257 A1* | 9/2012 | Brown | G06F 17/30902 709/213 |
| 2012/0324546 A1 | 12/2012 | Forster et al. | |
| 2013/0007205 A1* | 1/2013 | Humphreys | G06F 16/9574 709/217 |
| 2013/0067170 A1* | 3/2013 | Lam | G06F 12/08 711/137 |
| 2013/0111368 A1 | 5/2013 | Laughlin | |
| 2013/0122856 A1 | 5/2013 | Kalmbach et al. | |
| 2013/0138655 A1* | 5/2013 | Yan | G06F 16/337 707/738 |
| 2013/0253889 A1* | 9/2013 | Baker | G06Q 50/22 703/6 |
| 2013/0254471 A1 | 9/2013 | Kunimatsu et al. | |
| 2013/0298128 A1 | 11/2013 | Russinovich et al. | |
| 2014/0033094 A1 | 1/2014 | B'Far et al. | |
| 2014/0047064 A1 | 2/2014 | Maturana et al. | |
| 2016/0330269 A1* | 11/2016 | Alstad | H04L 67/06 |
| 2017/0032147 A1* | 2/2017 | Denner | G06F 21/6263 |

OTHER PUBLICATIONS

Dorigo, Marco and Thomas Stutzle, *Ant Colony Optimization*, Cambridge, Massachusetts, The MIT Press, 2004, p. 14.

PCT/US2013/050948, International Search Report and Written Opinion, dated Oct. 18, 2013, 11 pages.

Mukhopadhyay et al., "A Dynamic Web Page Predication Model Based on Access patterns to Offer Better User Latency," [online] Feb. 3, 2011 [retrieved on Oct. 3, 2013]. Retrieved from the Internet: <URL: http://arxiv.org/abs/1102.0684>.

Dimopoulus et al., "A Web Page Using Predication Scheme Using Sequence Indexing and Clustering Techniques," *Data and Knowledge Engineering*, vol. 69, No. 4, May 15, 2010, pp. 371-382.

PCT/US2013/050948, International Report on Patentabilty, dated Feb. 5, 2015, 7 pages.

Non-Final Office Action for U.S. Appl. No. 13/558,292 dated Feb. 25, 2014, 20 pages.

Final Office Action for U.S. Appl. No. 13/558,292 dated Jul. 17, 2014, 27 pages.

Non-Final Office Action for U.S. Appl. No. 13/558,292 dated Feb. 3, 2015, 27 pages.

Notice of Allowance for U.S. Appl. No. 13/558,292 dated Sep. 4, 2015, 17 pages.

Chinese Application No. 201380044511.7, Office Action dated Jun. 26, 2017, 17 pages (6 pages for the original document and 11 pages for the English translation).

* cited by examiner

| User | Time | From | To |
|---|---|---|---|
| <userid> | <time of transition> | <url> | <url> |

700

800

802 — Access User Activity Table For Session

804 — Calculate Number of Transitions For Session

806 — Calculate Transition Frequency Based on Number of Transitions and Session Length 808 — Determine Amount to Cache Based on Transition Frequency

HEURISTIC CACHING TO PERSONALIZE APPLICATIONS

CROSS REFERENCE TO RELATED APPLICATIONS

This application is a continuation of, and claims the benefit of and priority to U.S. patent application Ser. No. 13/558,292, filed Jul. 25, 2012 (now allowed), entitled "HEURISTIC CACHING TO PERSONALIZE APPLICATIONS," the entire contents of which is incorporated herein by reference.

BACKGROUND OF THE INVENTION

Users may interact with applications through user interfaces. The user interfaces may include various components for changing the state of the application. A user interface may, for example, provide numerous options for navigating the interface and/or processing data. Often, user interaction with a user interface causes the interface to change state. For example, a user selecting a button or other element may cause the user interface to change from a current display screen to a new display screen having different options available to the user.

Many applications are resource intensive in the sense that changes to an interface's state may cause a non-trivial use of computing resources. As one example, many applications utilize web-based technologies. A user may interact with a browser or other application executing on a client device that communicates with a server device. The server device may respond to user requests with information that allows the user's client-side application to update appropriately. The server itself may contact other servers, such as database servers, to obtain information needed to properly respond to the client requests. As a result, resource intensive applications often tax the various related computer systems. From the client's perspective, delays may be noticed where the client has to wait for a server response and/or where the client needs to process data before a transition to a new user interface state can be completed. Delays and other issues may be exacerbated in various environments, such as in environments where multiple clients simultaneously interact with a server.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Techniques for heuristic caching of application data are disclosed herein. In an embodiment, a computer-implemented method of heuristic caching is disclosed. The computer-implemented method may be used to facilitate navigation in an electronic environment. The method may include: identifying a plurality of potential user interface transitions available to a user; selecting, based at least in part on data specific to the user and data regarding a plurality of other users, a subset of the identified potential user interface transitions available to the user; and causing one or more actions to be taken that result in acceleration of one or more transitions of the selected subset upon selection by the user.

In the computer-implemented method, identifying the plurality of potential user interface transitions available to the user may include identifying, from a current user interface state, a plurality of selectable user interface elements, where each element is selectable to cause navigation to a corresponding user interface state. The data specific to the user may be a user type and the data regarding the plurality of other users may comprise data aggregated based at least in part on past navigational behavior of one or more users having the user type. The data specific to the user may also include data determined based at least in part on past navigational behavior of the user. In an embodiment, selecting the subset of the identified potential user interface transitions includes: ordering the plurality of user interface transitions based at least in part on the data specific to the user and the data regarding the plurality of other users; and selecting the subset based at least in part on positions in the ordered plurality of user interface transitions of members of the subset. The potential user interface transitions may be transitions of an application utilized by an organization and the user and the other users may use the application in connection with operations of the organization.

In addition to the foregoing, a computer system for facilitating navigation is disclosed. The computer system may include one or more processors and memory including instructions that, when executed by the one or more processors, cause the one or more processors facilitate navigation. The computer system may, for instance: identify potential user interface transitions available from a particular state of a user interface being used by a user; select, based at least in part on data specific to the user and data regarding a plurality of other users, a subset of the identified potential user interface transitions; and cause acceleration of one or more transitions of the selected subset upon selection by the user.

Causing acceleration of the one or more transitions of the selected subset may include, prior to selection by the user of a particular transition of the one or more transitions, causing data for the particular transition to be cached. Selecting the subset of the identified potential user interface transitions may include: identifying a characteristic of the user; and identifying the plurality of users as users sharing the identified characteristic; and scoring, based at least in part on navigational behavior of the plurality of users in connection with the user interface, the identified potential user interface transitions to produce scores corresponding to the identified potential user interface transitions. Selecting the subset of the identified potential user interface transitions may be based at least in part on the scores. In some embodiments, the user interface is configured to access a web-based application. Selecting the subset of the identified potential user interface transitions may include identifying a set of users that have navigated the user interface to the particular state. Selecting the subset of the identified potential user interface transitions may be based at least in part on behavior of the identified set of users that have navigated the user interface to the particular state. Selecting the subset of the identified potential user interface transitions may include determining a number of user interface transitions to cache based at least in part on an activity measurement of the user identifying the potential user interface transitions may include accessing a model of an application operated by user interaction with the user interface.

In an embodiment, one or more non-transitory computer-readable storage media having collectively stored thereon instructions executable by one or more processors of a computer system is disclosed. The instructions may include instructions for identifying potential user interface transitions available from a particular state of a user interface; instructions for selecting, based at least in part on data specific to a user of the user interface and data regarding a plurality of other users, a subset of the identified potential user interface transitions; and instructions for causing acceleration of one or more transitions of the selected subset upon selection by the user.

Causing acceleration of one or more transitions of the selected subset includes caching data for the one or more transitions prior to the selection by the user. Selecting the subset of the identified potential user interface transitions may include identifying a characteristic of the user and identifying the plurality of other users as users sharing the characteristic with the user. The characteristic, in some embodiments, is a role of the user in an organization. The one or more computer-readable media may include instructions for determining, based at least in part on an activity measurement of the user in connection with the user interface, a value determinative of a size of the subset, the subset being in accordance with the value. The value may be a number of transitions to cache. The activity measurement may be based at least in part on a frequency of transitions caused by interaction with the user interface by the user.

For a fuller understanding of the nature and advantages of the present invention, reference should be made to the ensuing detailed description and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

The following description describes an embodiment of the present invention in the web application domain. However, the scope of the present invention is not restricted to web applications, but may be applied to other domains or applications. For example, any domain or application where caching of data provides an advantage may make use of the present invention. Examples of domains in which embodiments of the present invention may be used include, generally, user interfaces that utilize data that are not immediately accessible and, therefore, where caching can improve usability of the interfaces.

In general, embodiments of the present invention provide techniques for using heuristic techniques for caching data to improve the usability of user interfaces, such as user interfaces from web applications. Generally, the techniques described herein utilize data about a user of a user interface and/or other users to make intelligent decisions about which data to cache. Such techniques may increase the likelihood that necessary data is readily available despite constraints of computing resources used in connection with operation of the user interface.

Figure 1:
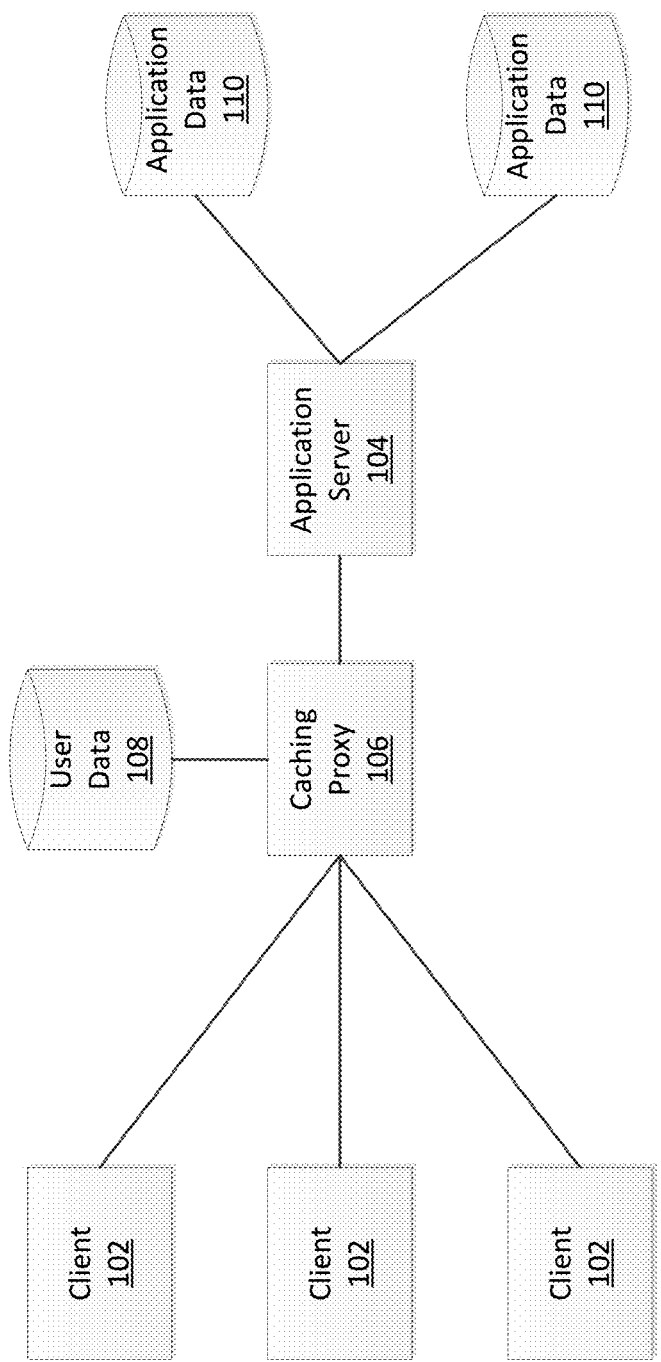
FIG. 1 shows an illustrative example of an environment which may be used to implement various embodiments of the invention.

FIG. 1 shows an illustrative example of an environment 100 that may be used to implement various embodiments of the present disclosure. In the environment 100, one or more clients 102 are used to enable corresponding users to use an application. The clients may be implemented by computer systems that access an application server 104 over a suitable communications network such as an intranet, the Internet, and/or a combination of communications networks. The clients 102 may be any suitable type of computer system such as a personal computer, notebook computer, tablet computing device, mobile computing device, and generally any device configured to communicate over a network and display application content. The clients may be hardware devices or may be virtual clients. The application server 104 may be a server computer system configured to execute one or more applications and to receive and respond to electronic requests submitted in connection with operation of the one or more applications. The applications may be, for example, web-based applications.

In an embodiment, the clients 102 interact with the application server 104 via a caching proxy 106. The caching proxy may be a computer system configured to cache application data in accordance with the various embodiments described herein. As will be described in more detail below, the caching proxy 106 may preload application data such that, when such data is needed by the clients 102, the caching proxy has such data immediately accessible without a need to obtain that data from another source such as the application server 104. As discussed below, requests from a client 102 may be routed to the caching proxy 106 to enable the caching proxy 106 to determine whether it has data responsive to the requests and to provide such data when available.

The application data may be stored in one or more data stores 110 accessible to the application server 104. To cache data, the caching proxy 106 may submit requests to the application server 104 for application data before such data is needed by one or more of the clients 102. The application server may respond to such requests by accessing application data from the data storage 110 and providing the data to the caching proxy 106 which may store the accessed data in a cache 112. When a client 102 makes a request for which application data is stored in the cache 112, the caching proxy 106 may obtain the application data from the cache 112 and provide it to the client 102. As noted, if such data is not in the cache 112, the caching proxy may submit a request to the application server 104, which may obtain the data from the data stores 110 and provide the data to the caching proxy 106 to provide to the client 102 that made the request.

In order to intelligently determine which data to store in the cache 112, the caching proxy may utilize data about one or more users of the application such as described in more detail below. Such user data may be stored in a data store 108. As will be described in more detail, the caching proxy may, for a particular use of a client 102, store information about the user's past activity in connection with the application and use that information in order to determine which application data is most likely to be accessed by the client. The data in the data store 108 may also include data regarding other users in order to enhance the accuracy of caching decisions. For example, a user of a client 102 may have certain characteristics. The caching proxy may access data regarding past behavior of other users having similar characteristics in order to determine which data to store in the cache 112. As an illustrative example, a user of a client 102 may have a particular role within an organization. The caching proxy may utilize data in the data store 108 regarding past behavior of other users with the same role.

It should be noted that environment 100 illustrated in FIG. 1 is divided into separate components for the purpose of illustration and numerous variations are considered to be within the scope of the present disclosure. For example, the environment illustrated in FIG. 1 shows clients that are separate from both a caching proxy 106 and an application server 104. Some embodiments may employ different configurations. Various components of the environment in FIG. 1 may be combined, for example. For instance, activities described as being performed by the caching proxy 106 may be performed by one or more of the clients 102. That is, clients 102 may, in some embodiments, be configured to make their own caching decisions and may cache their own application data accordingly. The clients 102 may, for instance, cache application data at convenient times, such as when computing resources of the client are idle or at least not fully utilized. In such embodiments, when the clients make their own caching decisions, user data for making such decisions may be stored locally at the clients 102 or remotely such as in a central repository accessible through web service or another suitable manner.

As another example of variations considered within the scope of the present disclosure, actions performed by the caching proxy 106 and the application server 104 may be performed by a single device. That is, the application server 104 may make caching decisions for one or more clients of the application server 104. Numerous other variations are also considered to be within the scope of the present disclosure. For example, FIG. 1 illustrates an application server 104 executing an application for clients 102. However, the clients themselves may execute the application. Caching decisions may be made by the clients 102 or by separate computing devices such as illustrated in FIG. 1. In addition to the variations described exclusively herein, other variations within the scope of the present disclosure may include environments that include more components than illustrated in the environment 100 of FIG. 1.

In an embodiment, an application has multiple possible states. For example, web-based applications may comprise numerous pages. A user may interact with the application by navigating from page to page. Each page may correspond to one or more states of the application. For example, upon first navigating into a page of an application, the page may have a certain form. The form may be personalized to the user using the application, although it may have general characteristics that are common to most users such as a common format. States of a page of an application may vary according to the various activities of the user. For instance, the user may use the application to make various queries about data accessible to the application. For instance, a page of a human resources application may allow a user on a page of an application to view various employment records of employees within an organization. That same employee may navigate to a different page of the application to perform other activities so as to generate reports regarding human resources data of the organization and the like.

Figure 2:
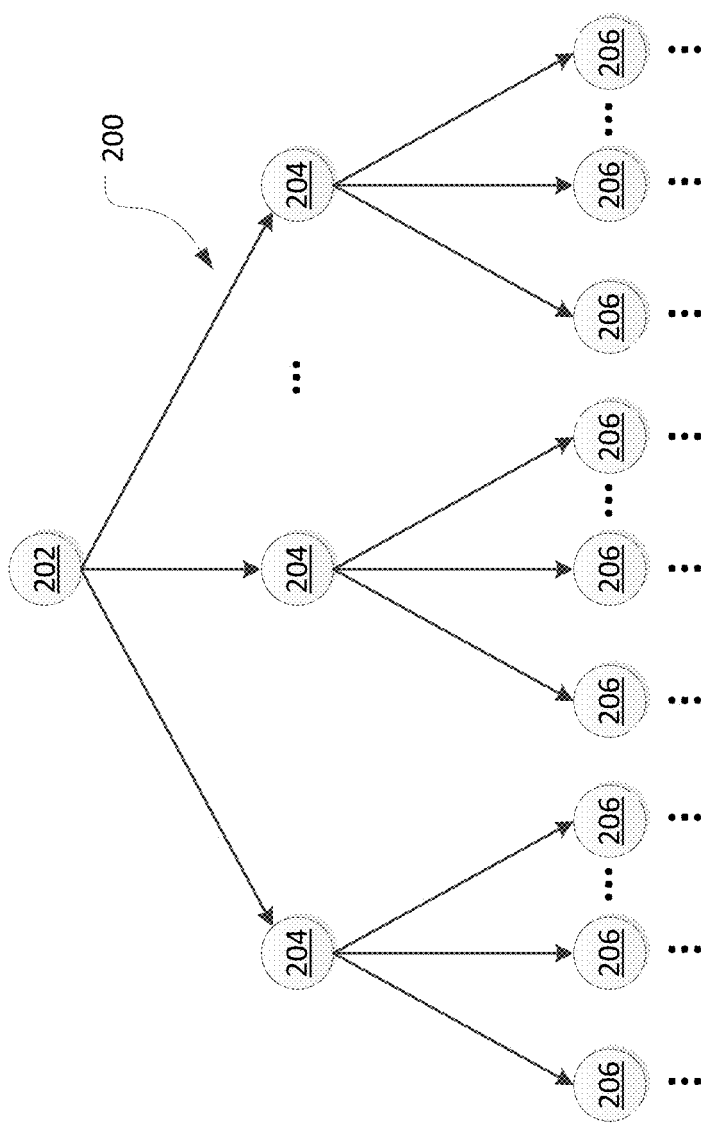
FIG. 2 shows an illustrative example of a representation of a model of an application, in accordance with at least one embodiment.

FIG. 2 accordingly shows a representation of states of an application in accordance with an embodiment. In particular, FIG. 2 represents the states of an application as a graph in the mathematical sense where the graph comprises nodes connected by edges. Each node of the graph may correspond to a possible state of an application or a set of states. An edge between two nodes indicates that a user of the application may cause the application to transition between corresponding states. In an embodiment, the graph is a directed graph whereby edges between nodes of the graph have a direction indicated by an arrow. Thus, an arrow between two nodes of the graph indicates that a state transition is possible from the state represented by the node of the tail of the arrow to the state represented by the head of the arrow. The arrows may have two heads indicating that the transition is reversible. An example of a reversible transition is a transition whereby a user in a web-based application selects the link and is able to navigate to a landing page of the link. The user may, for instance, by hitting a back button of a web browser, navigate back from the landing page to the page that has the link that was selected.

The graph as illustrated in FIG. 2 includes a root node 202 which may be a state of an application being processed in accordance with various embodiments of the present disclosure. The state may be, for example, the current state of the application as presented to the user. The state may also be a future state to which the user is able to navigate, perhaps through an intermediate state. In this particular example, the root node corresponds to a state from which transitions may be made to other states represented by nodes 204. Each of the nodes 204 also may correspond to states from which transitions may be made to other states represented by nodes 206. In FIG. 2, graph 200 is represented by a tree. However, numerous variations are considered as being within the scope of the present disclosure. For example, the graph may include cycles. A user may navigate, for instance, from a state represented by the node 202 to the state represented by the node 204 and back. As another example, the user may navigate from a state represented by the node 202 to the state represented by the node 204 to another state represented by the node 206, and from the state represented by the node 206 to the state represented by the node 202. As yet another example, the user may navigate from the state represented by the node 202 to a state represented by the node 204 to another state represented by a node labeled by 204.

As noted, states of an application may not be static. That is, when in a particular state, an application interface may have multiple presentations. For instance, a user interface may have controls that allow a user to selectively show and/or hide data. Scroll bars are examples of such controls as are drop-down menus and other controls that allow a user to control the appearance of an interface in a particular state. In addition, a state of a user interface may include dynamic content, such as audio or video which changes over time and content which changes according to certain user interactions with the user interface.

Figure 3:
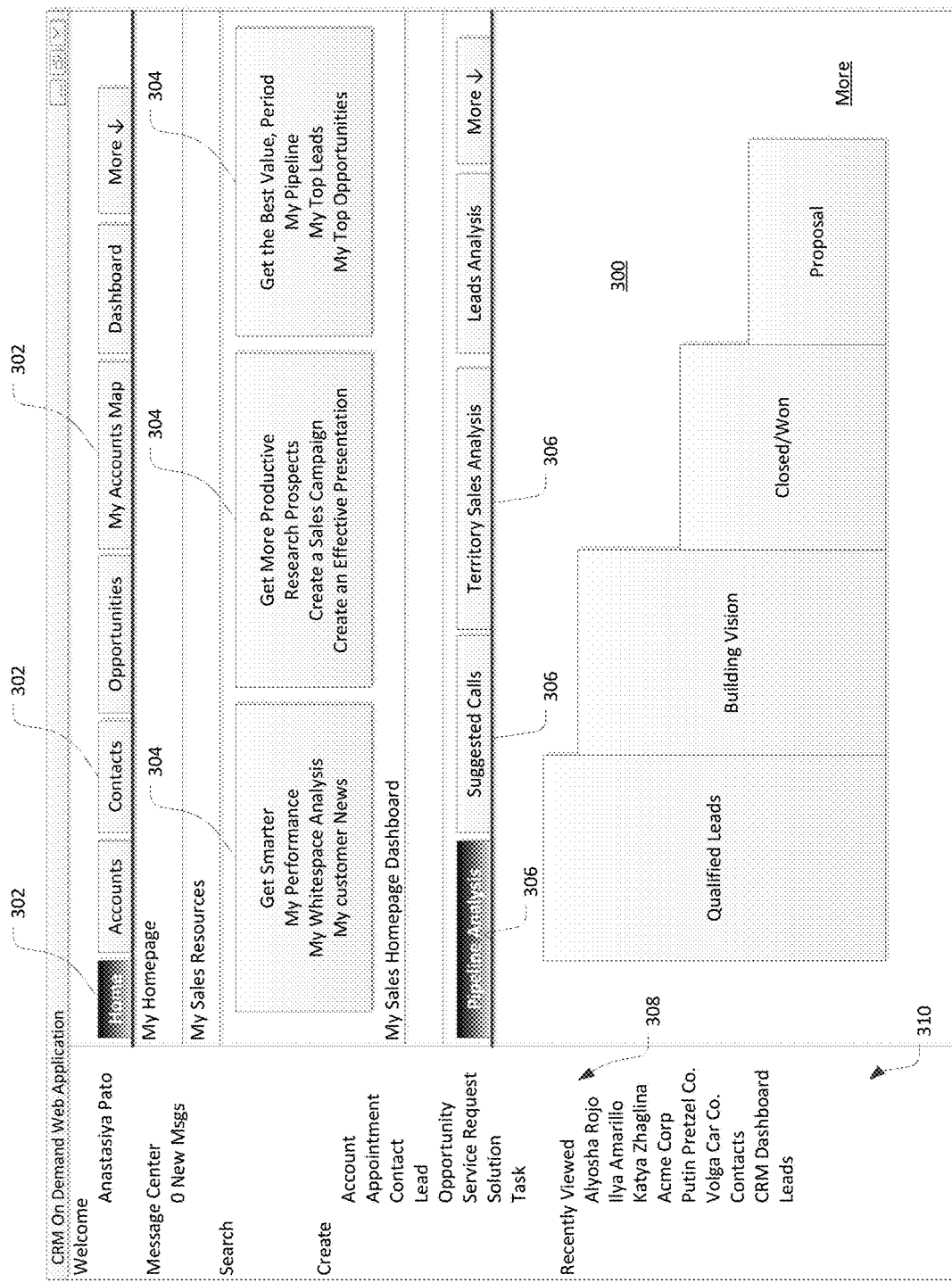
FIG. 3 shows an illustrative example of a user interface of an application in an illustrative state, in accordance with at least one embodiment.

FIG. 3 shows an illustrative example of an application as presented to a user, such as a user of a client 102, as described above in connection with FIG. 1. The application as illustrated in FIG. 3 is a web-based application and, in this particular instance, the web-based application is accessed using a browser application executing on a client's computing device. The application itself may execute on a server separate from the client's computing device, such as an application server described above in connection with FIG. 1. The application shown in FIG. 3 is in a particular state and has an appearance, which may be the appearance on a screen of a computing device. In this particular example, a presentation of data appears in the middle of the screen.

The application includes numerous links and other user interface controls which allow a user to operate the application. For instance, the application in this example includes numerous tabs 302. The tab in this particular example is a user interface element that is selectable to cause a different screen to appear where each screen has a corresponding theme. For example, in this example, the tabs include a home tab, an accounts tab, a contact tab and others. In this example, the home tab 302 is selected, causing the representation of the application to appear as it does in FIG. 3. The user may select the accounts tab 302 to access various information about user accounts. Selecting the accounts tab 302, for example, may cause the application to change to a state in which the various user accounts may be accessed. The accounts, for example, may be listed and selectable to navigate to information specific to a selected account. Search and other capabilities may also be provided by the application. In this manner, each of the tabs 302 corresponds to a state of the application.

In embodiments where data is retrieved over a network, user interaction with a user interface of the application may cause electronic communications to occur. For example, when a user interface control is selected by a user (such as by manipulating an input device), the client's device may transmit an electronic message (such as a hypertext transfer protocol (HTTP) request) to an appropriate computer system (such as a caching proxy or application server) to obtain corresponding information. When some or all of a response is received, the client's device may update a display accordingly.

Other selectable user interface elements are also provided in the sample of FIG. 3. For example, various hyperlinks 304 are provided. The hyperlinks may cause the application to navigate to pages corresponding with corresponding information. For instance, a "My Performance" hyperlink 304 may cause the application to navigate to a page that displays various statistical information and/or representations that are specific to the user of the application. In addition, the application may include additional tabs 306 which are specific to the current state of the application, whereas the tabs 302 described above may be global to the application. Thus, by selecting the home tab 302, various tabs 306 specific to the home tab 302 may appear.

Selectable elements on the user interface may include elements other than tabs, such as various links to enable the application to perform various functions. For example, the application shown in FIG. 3 includes numerous links under a "Create" category 308. For example, selecting an account link under the "Create" category 308 may cause the user interface to change to allow the user to enter information for a new user account.

Figure 4:
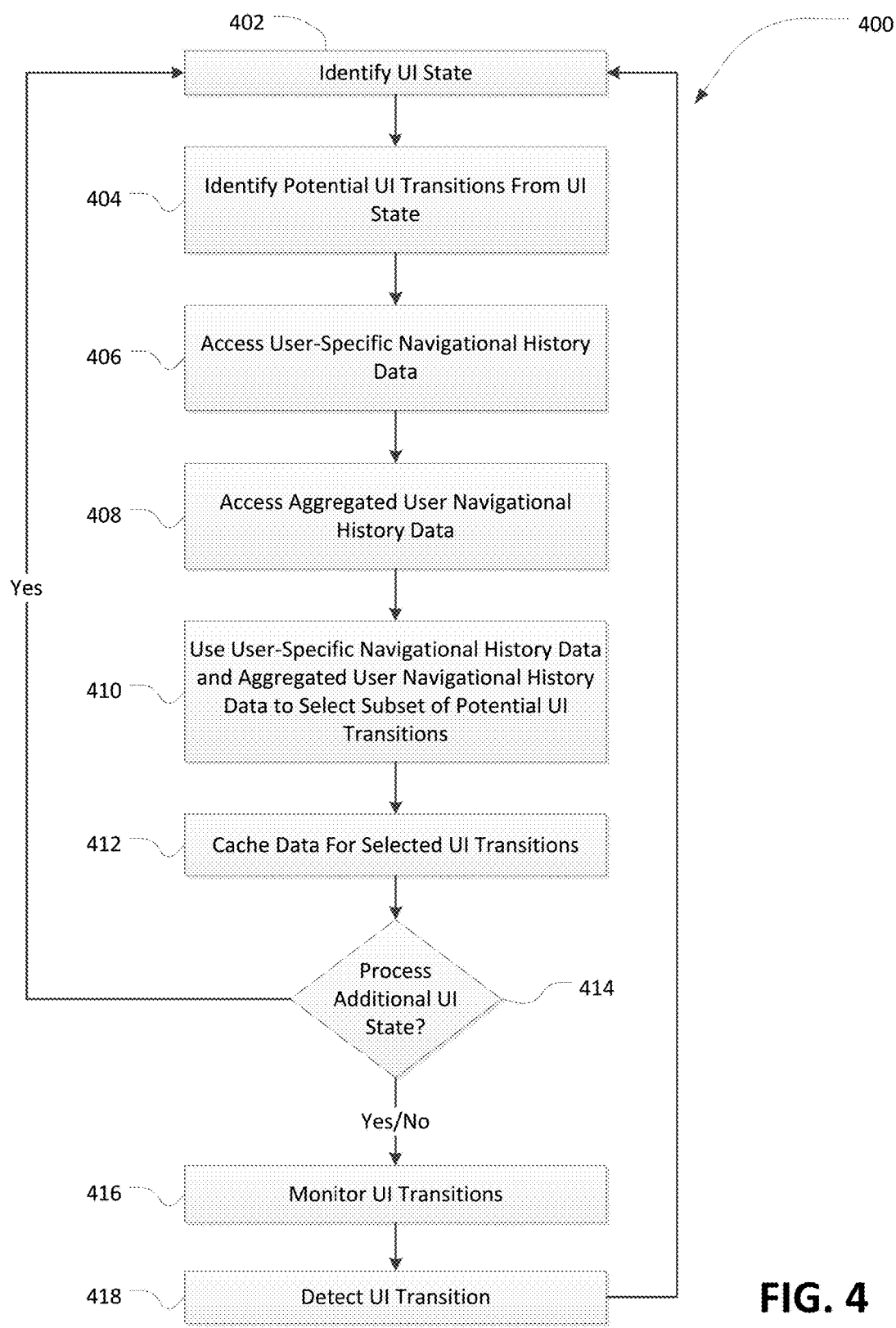
FIG. 4 shows an illustrative example of a process for heuristic caching, in accordance with at least one embodiment.

FIG. 4 shows an illustrative example of a process 400 for performing heuristic caching in accordance with an embodiment. Some or all of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, the process 400 includes identifying 402 a user interface state. The user interface state may be, for example, a current state of the application or a state to which the application may be transitioned directly or indirectly. When the state is identified 402, potential user interface transitions from the identified user interface state may then be identified 404. For example, referring to FIG. 2, if the identified state corresponds to the node 202, some or all states corresponding to the nodes 204 may be identified. Identifying the potential user interface transitions may be performed in any suitable manner. For example, for some applications, a graph or other model of the application may be known in advance. The application may have a predetermined number of states represented by a graph and identifying the potential user interface transitions may be performed by identifying transitions according to the graph. Transitions may be identified, for example, by identifying which nodes of the graph are directly connected to the node corresponding to the identified state. As another example, identifying the potentially user interface transitions may be performed dynamically, such as by scraping the identified user interface state. In a web-based application, scraping may be performed by analyzing a page of the application and extracting hyperlinks and other user interface elements that are selectable to cause a state transition. Scraping may be performed intelligently, such as by ignoring certain transitions. For instance, an application may have hyperlinks to external content providers, such as a search engine, news content provider and the like and such hyperlinks may be ignored.

In an embodiment, the process 400 includes accessing 406 user-specific navigational history data. The user-specific navigational history data may be data regarding how the user has interacted with the application in the past. The history application data may indicate, for example, the frequencies of user interface state transitions from the identified user interface state. As an example, if the user's role within an organization causes the user to frequently transition to a particular state and rarely transition to a different state, the user-specific navigational history data may include statistical information that indicates the relative frequency of such transitions.

In an embodiment, the process 400 also includes accessing 408 aggregated user navigational history data. The aggregated user navigational history data may be data that indicates the frequency of the user interface transitions from the identified state as measured over a period of time with respect to multiple users. The multiple users may be determined in many different ways depending on the specific embodiments being employed. For example, aggregated user navigational history data may aggregate data for all users of the application within an organization or perhaps a larger set of users of the application. As another example, the aggregated user navigational history data may include data for a select subset of users for the application, such as users having a characteristic that is the same as the user of the application. For instance, if the user has a particular role within the organization, the aggregated user navigational history data may include data aggregated according to the past navigational behavior of users having the same role. Characteristics, such as roles, may be stored in a data store in a manner associating the characteristics with the users, thereby enabling a determination of what characteristic(s) a user has and which users share that/those characteristic(s). Numerous variations are considered being within the scope of the present disclosure. For example, the aggregated user navigational history data may include data aggregated from various subsets of users of the application defined by a particular characteristic where the data for particular subsets may be weighted differently. For example, data for users with the same role as the user of the application may be rated more heavily than data for users within the same department, but having different roles.

In addition, the universe of users from which data is aggregated may also vary according to various embodiments. For example, in an embodiment, the user-specific navigational history data is aggregated for all users within an organization. However, different levels of granularity may also be used in accordance with the present disclosure. For example, if the application is used in multiple organizations, a central service may aggregate such data across users of multiple organizations. Similarly, if the application is used by numerous departments within an organization, the aggregated user navigational history data may be aggregated only for users within a department or other subset of users within the organization.

With user-specific navigational history data and aggregated user navigational history data having been accessed, in an embodiment, the process 400 includes using 410 the user-specific navigational history data and aggregated user navigational history data to select a subset of the potential user interface transitions. In an embodiment, the subset is selected to be a subset of the user interface transitions that includes one or more transitions that are most likely to be needed based on a calculation of what the user is likely to do. Once the subset of potential user interface transitions is identified 410, the data for the selected user interface transitions may be cached 412. For example, referring to FIG. 1, the caching proxy 106 may request data for the selected user interface transitions from the application server 104, which may access such data stores 110 and provide to the caching proxy 106 to store in the cache 112. Other components, such as the client or application server, may cache in addition to or as an alternative to a caching proxy.

In some embodiments, various levels of caching may be performed. For example, it may be desirable to cache user interface transitions that are not directly available from a current user interface state. For example, referring to FIG. 2, if the current user interface state corresponds to the node 202, it may be desirable to cache the transitions from some or all of the states represented by the nodes 204 to some of the states represented by the nodes 206. Such caching may, for example, cause needed data to be available should the user quickly transition from the state represented by the node 202 to a state represented by a node 206. The user may, for instance, navigate to a state represented by a node 204 and quickly navigate to a state represented by a node 206.

Accordingly, in an embodiment, the process 400 includes determining 414 whether to process an additional user interface state. If it is determined 414 to process an additional user interface state, then additional user interface state is identified 402, such as described above and the process 400 may proceed accordingly as described above. If, however, it is determined 414 to not process an additional state, then additional performance of the process 400 may depend on how the user interacts with the application. A determination whether to process another state may depend at least in part on various characteristics of a computing environment implementing an embodiment of the invention. For example, a determination whether to process another state may be made based at least in part on the number of users currently utilizing an application and/or caching proxy (such as a number of users with a connection to the caching proxy and/or to an application server), an available amount of storage space in a cache, a frequency at which a user (or other users) are causing the application to change states, and other information.

As indicated in FIG. 4, in an embodiment, regardless of whether or not it is determined 414 to process additional user interface state, user interface transitions are monitored 416 and if a user interface transition is detected 418, a corresponding user interface state may be identified 402 and the process 400 may proceed as described above. Thus, detection of a user interface transition may interrupt performance of the process 400 to cause the process 400 to restart, accordingly, so that applicable user interface transitions are cached. Generally, the process 400 may include continuous monitoring of user interface transitions with the process 400 being updated accordingly so as to process current state data.

Figure 5:
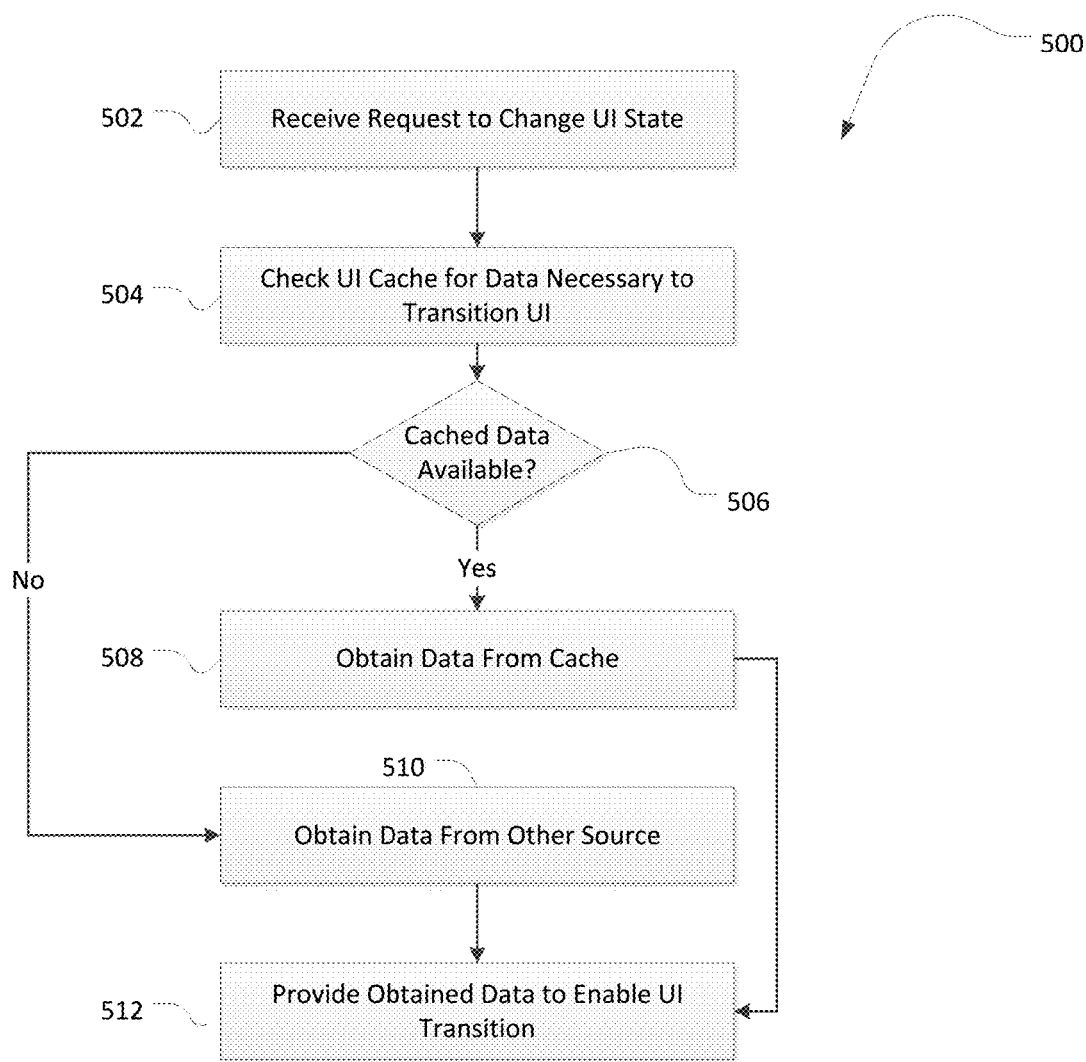
FIG. 5 shows an illustrative example of a process for utilizing a cache, in accordance with at least one embodiment.

FIG. 5 shows an illustrative example of a process for providing application data in accordance with an embodiment. The process 500 may be performed, for example, by a computing device that caches application data, such as the caching proxy described above in connection with FIG. 1. In an embodiment, the process 500 includes receiving 502 a request to change the user interface state. The request may be received in any suitable manner which may depend on the specific embodiments in which the process 500 is being performed. For example, in the environment 100 described above in connection with FIG. 1, a caching proxy may receive an HTTP request from a client pursuant to a user of the client having used a browser or other application to select a hyperlink of the application, the application being configured such that selection of the hyperlink causes change of the user interface state.

Upon receipt of the request to change the user interface state, a user interface cache for data necessary to transition the user interface is checked 504. For instance, the caching proxy described above in connection with FIG. 1 may check the cache to determine whether the data is already cached. A determination may be made 506 whether cache data is available. If it is determined 506 that cache data is available, then data from the cache may be obtained 508. If it is determined that data from the cache is not available, then data may be obtained 510 from another source. For example, referring to FIG. 1, if the caching proxy determines that cached data is not available, then the caching proxy may submit a request to the application server to enable the application to respond with the appropriate data. The caching proxy may simply forward the request from the client to the application server or it may reconfigure the request as appropriate depending on the specific embodiment. Once the data is obtained, either from the cache or from the other source, the obtained data may be provided 512 to enable the user interface to transition according to the received 502 request. In the example of a web application, an electronic document corresponding to the new state of the user interface may be provided to client. Similarly, data for changing a portion of a user interface page displayed on the client may be provided to the client.

As with all processes described herein, the process 500 or variations of the process 500 are considered as being within the scope of the present disclosure. For instance, in some embodiments, a user interface states transition may require both data from a cache and data that is not cached. For instance, certain data to be displayed on a user interface may be available from the cache, whereas it may be necessary to obtain other data from a different source. In such instances, the process 500 may be modified such that the data is obtained accordingly and provided to the client for display to the user. A caching proxy or other device may collect the data from the cache and from the other source and provide all the data at once to the client or it may dynamically provide the cache data and then once available, the data from the other source.

Figure 6:
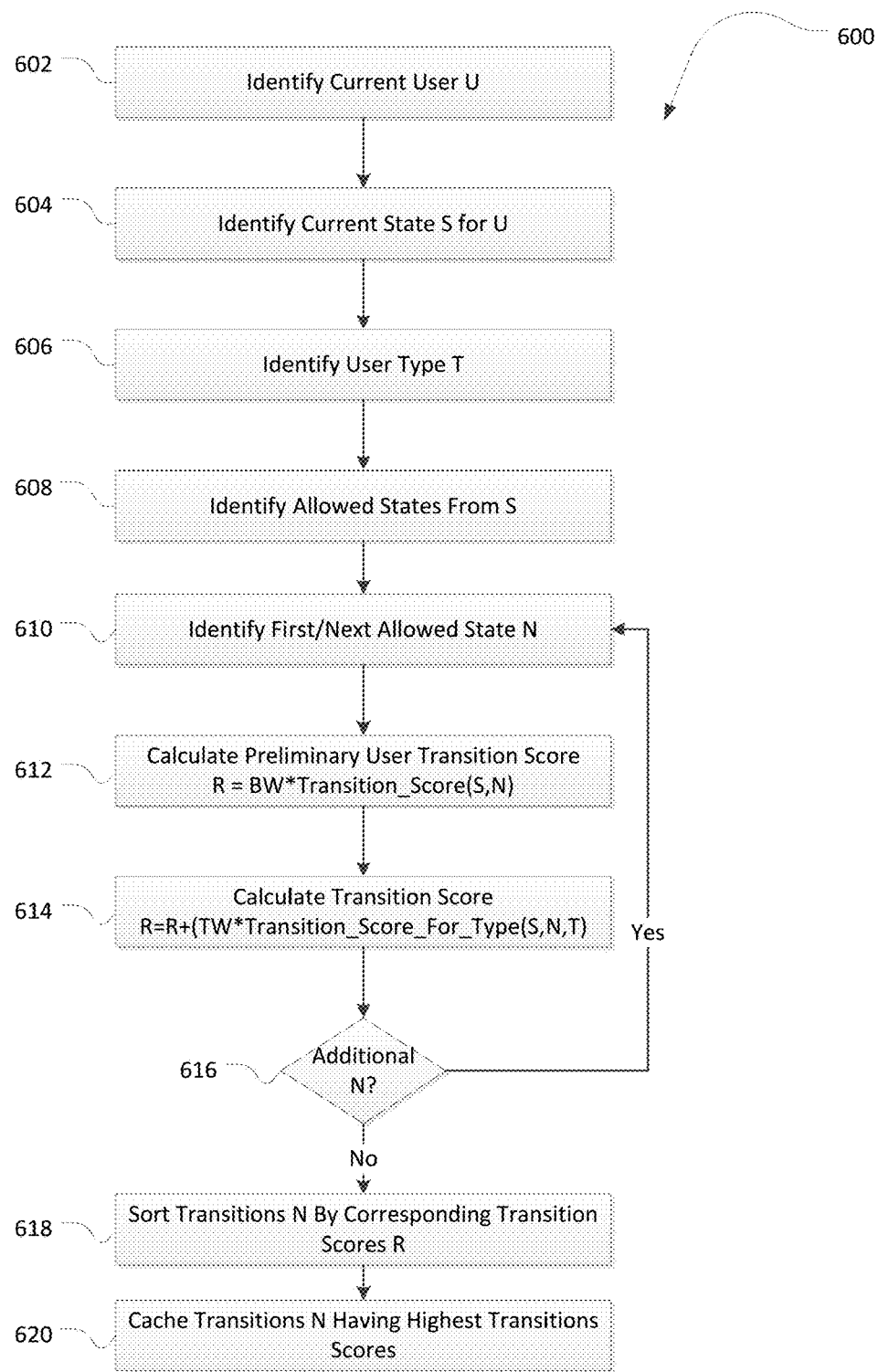
FIG. 6 shows an illustrative example of a process for heuristic caching, in accordance with at least one embodiment.

As discussed above, various embodiments of the present disclosure are related to caching data for applications based at least in part on past user behavior, such as behavior of the user using the application and/or other users. FIG. 6, accordingly, shows an illustrative example of a process 600 for one manner in which such caching may be done. In an embodiment, the process 600 includes identifying 602 a current user U. A current user may be, for example, a user of an application for which caching is being performed. In addition, the process 600 may include identifying 604 a current state S for the user U. A user type T may also be identified 606 for the user U. In an embodiment, the process 600 includes identifying 608 allowed states from the current state S.

As described below, a device participating in performance of the process 600 may process the allowed states to determine which states to cache. For instance, in an embodiment, the process 600 includes identifying 610 a first allowed state. Upon identifying the first allowed state, a preliminary user transition score may be calculated 612. In an embodiment, the preliminary user transition score is a score that is based at least in part on the current state, the allowed state and a weighting factor identified in the drawing as BW. The preliminary user transition score may indicate, for instance, a historically measured frequency of that transition relative to transitions to other allowed states.

In an embodiment, the process 600 may include calculating a transition score 614. A transition score in an embodiment is a score that is based, at least in part, on the preliminary user transition score and a transition score for users of the identified user type T. A weighting factor, indicated in the drawing as TW may also be used. A determination may be made 616 whether there are additional allowed states and, if there are, the next allowed state is identified 610 and a transition score is calculated for the next allowed state as described above. As noted above, the transition score may be based on behavior of numerous users of numerous types shared with the user U. Weighting may be used to favor certain types of users (e.g. users with the same role) over other types of users (e.g. users simply in the same organization, department, and others).

Once preliminary user transition scores and transition scores for the allowed states have been calculated, a determination may be made 616 that there are no additional allowed states to process. The transitions may be sorted 617 by corresponding transition scores. The transitions having the highest transition scores may be cached 620. The number of transitions selected may vary according to the various embodiments. For example, in some cases, a number of allowable transitions up to a predetermined number may be cached. As another example, a number of transitions cached may be a dynamic number which may depend on other information, such as a rate at which a user is utilizing an application, which may be a rate at which a user is causing the user interface to change states. Other information that may be used to determine how many transitions to cache may include the size of a cache, the available storage space remaining in the cache, activity of other users, and other relevant information. Other information, such as a user's historical activity level in connection with the application, other users' historic activity level in connection with the application, and other information regarding past measured activity in connection with the application may be used.

Figures 7, 8:
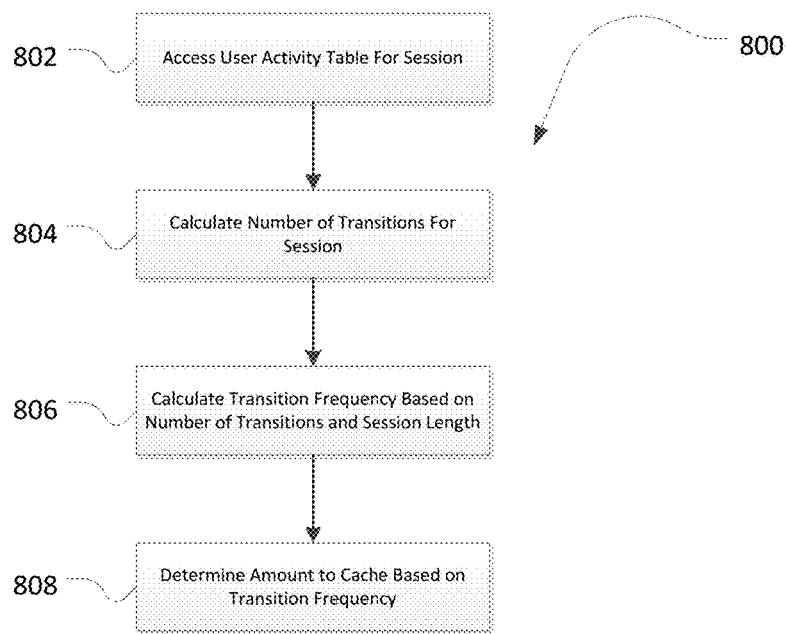
FIG. 7 shows an illustrative example of a user activity table, in accordance with at least one embodiment.
FIG. 8 shows an illustrative example of a process for determining an amount to cache for a user, in accordance with at least one embodiment.

One way by which determining the number of user interface transitions to cache may involve use of a user activity table. FIG. 7, accordingly, shows an illustrative example of a user activity table 700 in accordance with various embodiments. In an embodiment, the user activity table 700 organizes data representative of user activity of one or more users of an application. For example, as illustrated in FIG. 7, the user activity table 700 includes a user column, the entries of which correspond to an identifier of a particular user. The user identifier may be a unique identifier of a user, such as user name or other information that identifies the user. A time column has entries corresponding to transition times of various transitions made by the users whose identifiers are stored in the table 700. The time of transition may be the time the transition was requested, the time the transition was made and/or other related time. A "from" column and a "to" column indicate the states from and to which the transitions were made at the corresponding times. On this particular example, the user activity table is a correspondence to a web based application and, as a result, the entries in the "from" and "to" columns correspond to uniform resource locators (URLs) of the corresponding user interface states.

FIG. 8 shows an illustrative example of a process 800 that may be used to determine an amount of data to cache based at least in part on transition frequency of a user. In an embodiment, a user activity table for a session is accessed 802. A user activity table for a session may be similar to the table 700 described above in connection with FIG. 7, but specific to one user during a current session. The user activity table for the session may be, in some embodiments, a sub-table of the table 700 described above in FIG. 7 and may be accessed by extracting the sub-table from the table 700. Generally, the user activity table (or other encoding of user activity) for the session may be accessed in any suitable manner. In an embodiment, the process 800 includes calculating 804 a number of transitions for the session which may be the number of state transitions made during the transitions by the user. A transition frequency may be calculated 806 based at least in part on the number of transitions and session lengths in order to give a number that represents how active the user is using the application. An amount to cache may be determined 808 based at least in part on the calculated transition frequency. Generally, a system being used in connection with the process 800 may be configured such that the higher the transition frequency, the more data is cached. In this manner, data is more likely to be cached when needed by an active user whereby less is cached relatively for inactive users because such users are less likely to require certain data within a short period of time. The amount of cache may also be determined on the transition frequency relative to other transition frequencies of other users currently using the application and/or expected to use the application.

Figure 9:
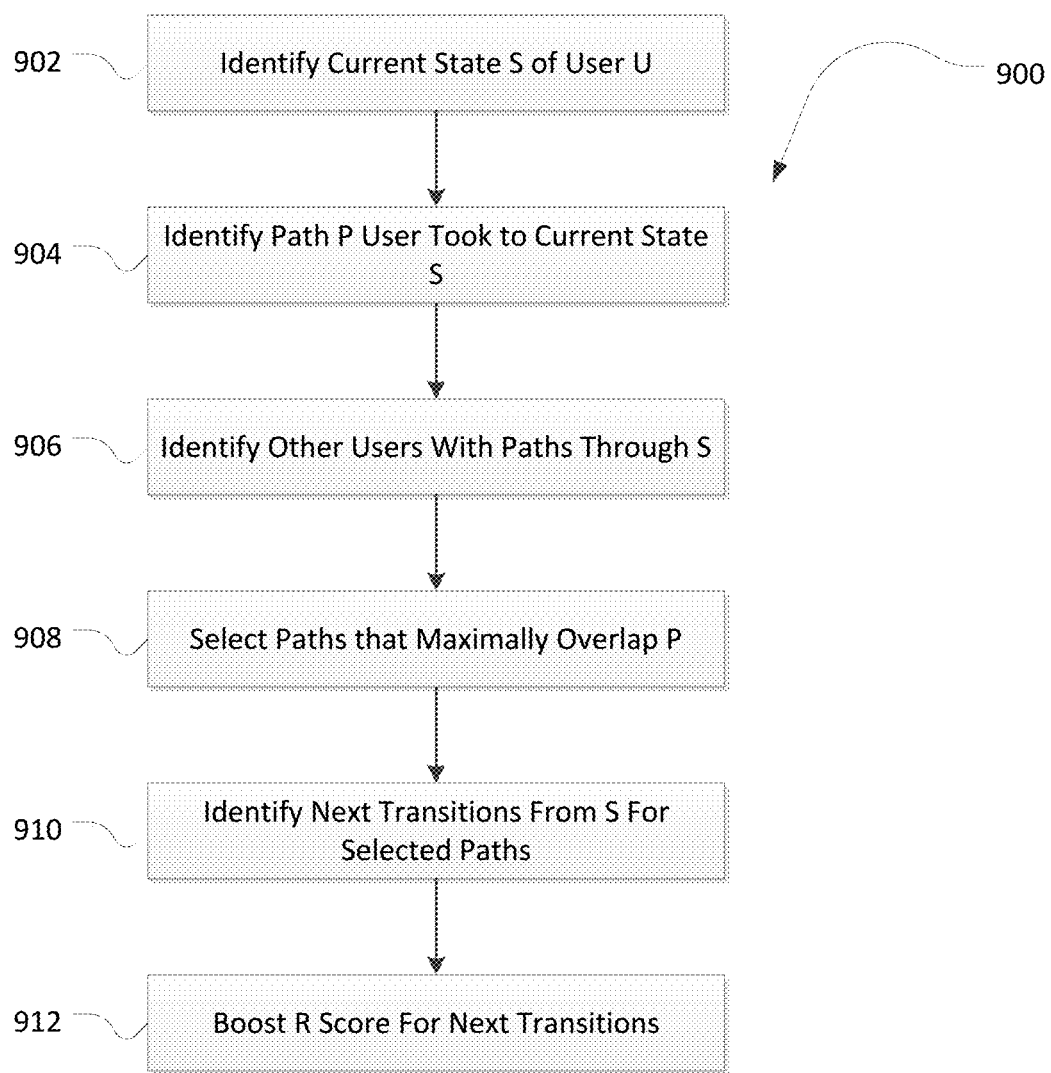
FIG. 9 shows an illustrative example of a process for using other user activity to perform heuristic caching, in accordance with at least one embodiment.

In many instances, certain user interface transitions are more desirable to cache than others based on the likelihood that such transitions will be required during the use of an application. FIG. 9, accordingly, shows an illustrative example of a process 900 that can be used to boost transition scores for certain user interface transitions based on what other users have done in connection with the application. In an embodiment, the process 900 includes identifying 902 a current state S of a user U. In an embodiment, a path P a user took to arrive at the current state S is identified 904, where a path may be a collection of nodes in a graph and the edges connecting those nodes. In an embodiment, the process 900 includes identifying 906 other users who have used the application and, as a result, have arrived at the current state S. A data store may store such information in a database that associates users with states.

Paths that maximally overlap the path P are selected 908, in accordance with an embodiment. Selecting the paths that maximally overlap the path P may be performed by selecting paths of other users that, relative to other paths including the state S, have higher numbers of common nodes with the path P, including the state S. Selecting the paths that maximally overlap the path P may also include identifying those paths that, relative to other paths, include the most consecutive nodes leading to the state S that are common to the path P. The number of paths may be predetermined, or may be determined in other ways, such as by identifying paths that have more than a predetermined number of nodes in common with P and/or paths that satisfy one or more conditions for inclusion. Once the paths are selected, the next transitions from the state S for the selected paths are identified 910. Transition scores for the identified next transitions are boosted accordingly. For example, when calculating a transition score, numerical values corresponding to the identified 910 paths may be multiplied by a number greater than one to increase their numerical value relative to other scores. Similarly, numerical values corresponding to paths other than the identified 910 paths may be multiplied by a numerical value less than one to reduce their relative effect on the calculation of a transition score. Generally, any suitable way of causing the identified paths to have a greater influence on scoring may be used.

As noted above, the size of a cache may be determined dynamically and intelligently. Various embodiments of the present disclosure involve decisions regarding management of a cache. In an embodiment, a system employing various techniques described herein may use a setting, T, which provides a soft limit on how many items, in total, the cache can contain. The system may also utilize tuning parameters, LAD and LBD, where LAD represents look-ahead depth and LBD represents look-back depth. The LAD and LBD values may correspond to how many levels of caching are to be performed for a user. Generally, for the sake of efficiency, the LAD and LBD parameters may be allocated in a manner such that a user with a more active session (i.e. with a higher rate of transitions) is given a larger percentage of the cache than will a user with a less active session (i.e. a lower rate of transitions).

In an embodiment, a User Activity table, such as illustrated in FIG. 7 is maintained. The table may be ordered by user and time, although other organizations of the table's (or other data structure's) contents may be used. Using this table, transitions per unit of time (e.g. per minute) are calculated, in an embodiment.

In an embodiment, a number of items to allocate for each active user is determined such that the mean, M, number of items allocated per user is T/U, where U is the number of active users. In particular, the number of items for each user may be allocated to minimize (or otherwise reduce) the allocation for inactive users, and increase the allocation for active users while respecting T as a soft constraint. To do this, a value A for each active user may be calculated, where A may be a transition rate (transitions per unit time) since the cache was last balanced. Ranges (referred to herein as B ranges) may be created, where B=N+LAD+LBD, where N is a numerical value. In an embodiment, N is 3, although other values may be used. Each range represents a span of activity levels.

The number of users that fit into each range may then be counted and a histogram of activity levels, represented by B bins may be created. Using this histogram, in an embodiment, the probability density function (PDF) and/or cumulative distribution function (CDF) is determined. The PDF and/or CDF may be used to guide the cache allocation. For example, an assumption may be made that the area under the PDF curve is approximately equal to the number of samples, S, to form a heuristic. This may rely on the assumption that S is substantially less than T.

Figure 10:
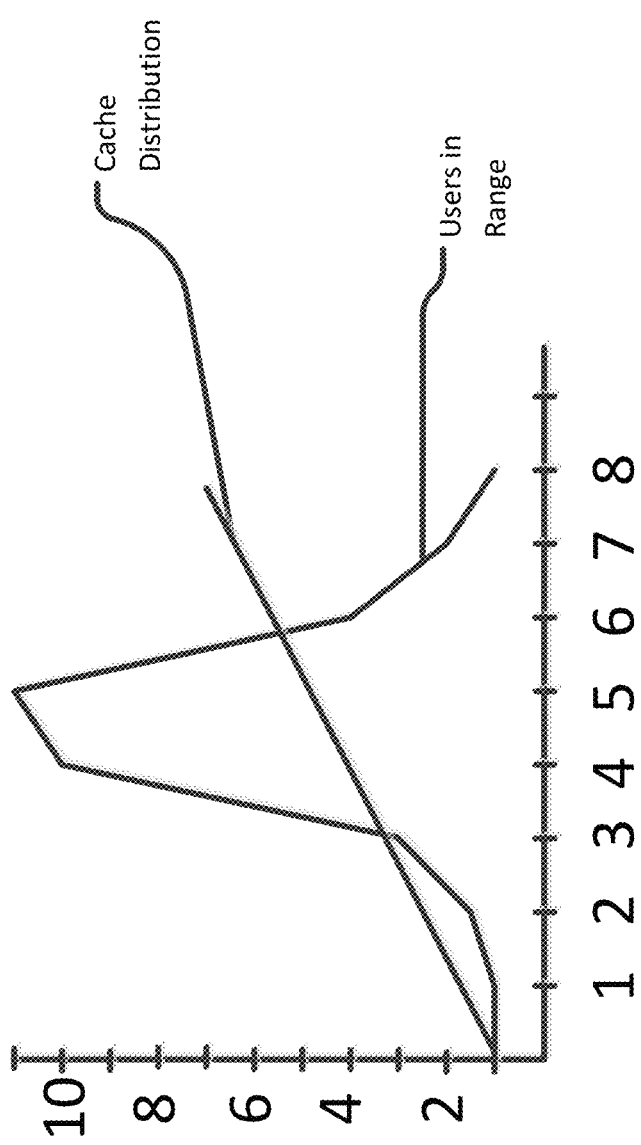
FIG. 10 shows an illustrative example of a graphical representation of caching heuristic data, in accordance with at least one embodiment.

In an embodiment, a rectangle of width B and height H, such that B*H=2S is determined. H is then equal to 2S/B and the diagonal from B[0] to B[−1] has slope HB, and the resulting triangles each have an area of S. The "lower" triangle crosses B bins, creating B component areas. The percentage of S that each component area represents may then be calculated. These percentages may then be used to distribute the T items across the components. The result, in this illustrative example, is that as the bin number (i.e. the activity level) increases, the users in that bin are allocated a larger percentage of T. An illustration of this example is provided in FIG. 10. As shown in FIG. 10, the cache distribution is calculated such that the curve labeled "Cache Distribution" begins at the point (0,1) and increases (in this example linearly) so that, at a value of 8 on the horizontal axis, the area under the Cache Distribution curve approximates the area under the curve labeled "Users in Range."

Figure 11:
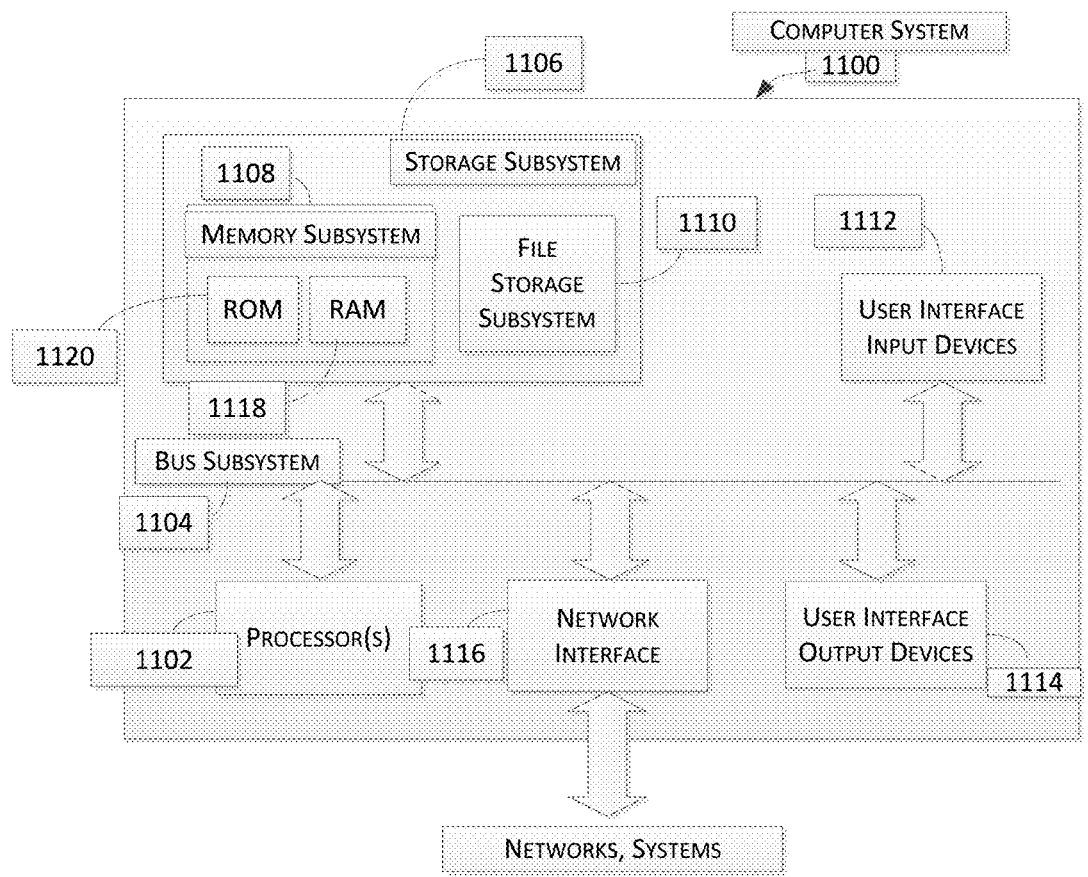
FIG. 11 shows a diagrammatic representation of a computer system that may be used to implement various aspects of the invention.

FIG. 11 is a simplified block diagram of a computer system 1100 that may be used to practice an embodiment of the present invention. Computer system 1100 may serve as a client device, caching proxy, application server, or other device. As shown in FIG. 11, computer system 1100 includes a processor 1102 that communicates with a number of peripheral subsystems via a bus subsystem 1104. These peripheral subsystems may include a storage subsystem 1106, comprising a memory subsystem 1108 and a file storage subsystem 1110, user interface input devices 1112, user interface output devices 1114, and a network interface subsystem 1116.

Bus subsystem 1104 provides a mechanism for letting the various components and subsystems of computer system 1100 communicate with each other as intended. Although bus subsystem 1104 is shown schematically as a single bus, alternative embodiments of the bus subsystem may utilize multiple busses.

Network interface subsystem 1116 provides an interface to other computer systems, networks, and portals. Network interface subsystem 1116 serves as an interface for receiving data from and transmitting data to other systems from computer system 1100.

User interface input devices 1112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1100. A user may use an input device to navigate a user interface which has state transitions cached according to an embodiment of the invention.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100. Presentations of a user interface may be provided to a user using an output device 1114.

Storage subsystem 1106 provides a computer-readable medium for storing the basic programming and data constructs that provide the functionality of the present invention. Software (programs, code modules, instructions) that when executed by a processor provide the functionality of the present invention may be stored in storage subsystem 1106. These software modules or instructions may be executed by processor(s) 1102. Storage subsystem 1106 may also provide a repository for storing data used in accordance with the present invention, for example, the data stored in the diagnostic data repository. For example, storage subsystem 1106 provides a storage medium for persisting one or more ontologies. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. Memory may also be accessible over a network, which may be, for instance, an Internet or intranet.

Computer system 1100 can be of various types including a personal computer, a portable computer, a tablet computer, a mobile communication device, a workstation, a network computer, a mainframe, a kiosk, a server or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. One or more non-transitory computer-readable storage media having collectively stored thereon instructions executable by one or more processors of a computer system, the instructing comprising:
    instructions for determining a first user transition score based in part on a first user interface state of an application utilized by a user, a next user interface state, and a first weighting factor;
    instructions for determining a second user transition score for a plurality of other users that share a common characteristic with the user, the second user transition score based at least in part on a second weighting factor, different from the first weighting factor, that corresponds to the plurality of other users;
    instructions for selecting a subset of one or more user interface transitions to be cached, the subset of the one or more user interface transitions to be cached corresponding to at least the first user transition score and the second user transition score and being selected by:
        identifying a time of transition for the user associated with the one or more user interface transitions;
        calculating a number of transitions for a session based at least in part on the time of transition for the user associated with the one or more user interface transitions;
        calculating a transition frequency of the user for transitioning from a first user interface transition to the one or more user interface transitions based at least in part on the number of transitions and a browsing session length for the session; and
        calculating a combined user transition score based at least in part on the first user transition score and the second user transition score; and
    instructions for causing one or more actions to be taken that result in caching each user interface transition within the subset based at least in part on the transition frequency and the combined user transition score.

2. The one or more non-transitory computer-readable storage media of claim 1, wherein the first user transition score indicates a historically measured frequency associated with transitions from the user interface state to the next user interface state.

3. The one or more non-transitory computer-readable storage media of claim 1, wherein caching each user interface transition within the subset comprises caching user interface transitions that are potential future transitions of the user.

4. The one or more non-transitory computer-readable storage media of claim 1, further comprising instructions for identifying the plurality of potential user interface transitions available to the user by identifying, from the user interface state, a plurality of selectable user interface elements.

5. The one or more non-transitory computer-readable storage media of claim 4, wherein each selectable user interface element of the plurality of potential user interface elements is configured to cause navigation to a corresponding user interface state.

6. The one or more non-transitory computer-readable storage media of claim 1, wherein first data specific to the characteristic of the user comprises data that corresponds to past navigational behavior of the user.

7. The one or more non-transitory computer-readable storage media of claim 1, wherein selecting the subset of the one or more user interface transitions comprises ordering the plurality of potential user interface transitions based at least in part on first data specific to the characteristic of the user and second data regarding the plurality of other users.

8. The one or more non-transitory computer-readable storage media of claim 7, wherein selecting the subset of the one or more user interface transitions further comprises selecting the subset based at least in part on positions in the plurality of potential user interface transitions of members of the subset.

9. The one or more non-transitory computer-readable storage media of claim 1, wherein the plurality of potential user interface transitions comprise transitions of the application utilized by an organization.

10. The one or more non-transitory computer-readable storage media of claim 9, wherein the user and the other users use the application in connection with operations of the organization.

11. The one or more non-transitory computer-readable storage media of claim 1, wherein the caching of the subset of the one or more user interface transitions is caused by causing data for the one or more user interface transitions to be cached.

12. The one or more non-transitory computer-readable storage media of claim 1, wherein selecting the subset of the one or more user interface transitions comprises identifying a plurality of users as users sharing the characteristic.

13. The one or more non-transitory computer-readable storage media of claim 12, wherein selecting the subset of the one or more user interface transitions comprises scoring, based at least in part on past navigational behavior of the plurality of users in connection with the user interface, the plurality of potential user interface transitions to produce scores corresponding to each of the plurality of potential user interface transitions, wherein selecting the subset of the one or more user interface transitions is based at least in part on the scores.

14. The one or more non-transitory computer-readable storage media of claim 13, wherein selecting the subset of the one or more user interface transitions based at least in part on the scores comprises selecting a threshold number of the scores that are the highest.

15. The one or more non-transitory computer-readable storage media of claim 1, wherein selecting the subset of the one or more user interface transitions comprises identifying a set of users that have navigated the user interface to the user interface state, and wherein selecting the subset of the one or more user interface transitions is based at least in part on behavior of the set of users that have navigated the user interface to the user interface state.

16. The one or more non-transitory computer-readable storage media of claim 1, further comprising instructions for determining, based at least in part on an activity measurement of the user in connection with the user interface, a value determinative of a size of the one or more user interface transitions, wherein the one or more user interface transitions are in accordance with the value, and wherein the value is a number of transitions to cache.

17. A computer-implemented method of facilitating navigation in an electronic environment, comprising:
identifying, by one or more processors of a computing device, a first user interface state of an application utilized by a user;
determining, by the one or more processors of the computing device, a first user transition score based at least in part on the first user interface state, a next user interface state, and a first weighting factor;
determining, by the one or more processors of the computing device, a second user transition score for a plurality of other users that share a common characteristic with the user, the second user transition score based at least in part on a second weighting factor, different from the first weighting factor, that corresponds to the plurality of other users;
selecting, by the one or more processors of the computing device, a subset of one or more user interface transitions to be cached, the subset of the one or more user interface transitions to be cached corresponding to at least the first user transition score and the second user transition score and being selected by:
identifying a time of transition for the user associated with the one or more user interface transitions;
calculating a number of transitions for a session based at least in part on the time of transition for the user associated with the one or more user interface transitions;
calculating a transition frequency of the user for transitioning from a first user interface transition to the one or more user interface transitions based at least in part on the number of transitions and a browsing session length for the session; and
calculating a combined user transition score based at least in part on the first user transition score and the second user transition score; and
causing, by the one or more processors of the computing device, one or more actions to be taken that result in caching each interface transition within the subset based at least in part on the transition frequency and the combined user transition score.

18. A computer system for facilitating navigation, comprising:
one or more processors; and
memory including instructions that, when executed by the one or more processors, cause the one or more processors to at least:
identify a first user interface state of an application utilized by a user;
determine a first user transition score based at least in part on the first user interface state, a next user interface state, and a first weighting factor;
determine a second user transition score for a plurality of other users that share a common characteristic with the user, the second user transition score based at least in part on a second weighting factor, different from the first weighting factor, that corresponds to the plurality of other users;
select a subset of one or more user interface transitions to be cached, the subset of the one or more user interface transitions to be cached corresponding to at least the first user transition score and the second user transition score and being selected by:
identifying a time of transition for the user associated with the one or more user interface transitions;
calculating a number of transitions for a session based at least in part on the time of transition for the user associated with the one or more user interface transitions;
calculating a transition frequency of the user for transitioning from a first user interface transition to the one or more user interface transitions based at least in part on the number of transitions and a browsing session length for the session; and
calculating a combined user transition score based at least in part on the first user transition score and the second user transition score; and
cause one or more actions to be taken that result in caching each user interface transition within the subset based at least in part on the transition frequency and the combined user transition score.

* * * * *

UNITED STATES PATENT AND TRADEMARK OFFICE
CERTIFICATE OF CORRECTION

PATENT NO. : 10,372,781 B2
APPLICATION NO. : 14/957904
DATED : August 6, 2019
INVENTOR(S) : B'Far et al.

Page 1 of 1

It is certified that error appears in the above-identified patent and that said Letters Patent is hereby corrected as shown below:

In the Specification

In Column 3, Line 33, delete "invention;" and insert -- invention. --, therefor.

In Column 14, Line 27, delete "HB," and insert -- H/B, --, therefor.

In the Claims

In Column 17, Line 2, in Claim 4, delete "pluralty" and insert -- plurality --, therefor.

Signed and Sealed this
Fourth Day of August, 2020

Andrei Iancu
*Director of the United States Patent and Trademark Office*